S. A. NEIDICH.
MACHINE FOR TESTING TYPE WRITER RIBBONS, &c.
APPLICATION FILED MAY 1, 1912.
1,140,912.
Patented May 25, 1915.
2 SHEETS—SHEET 1.
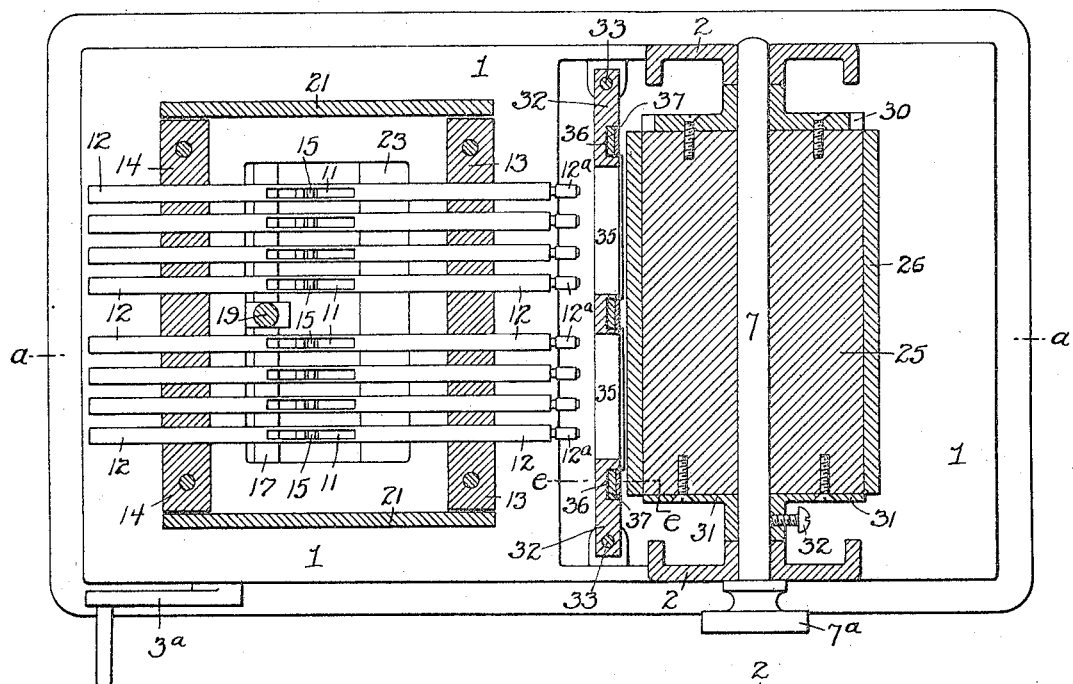
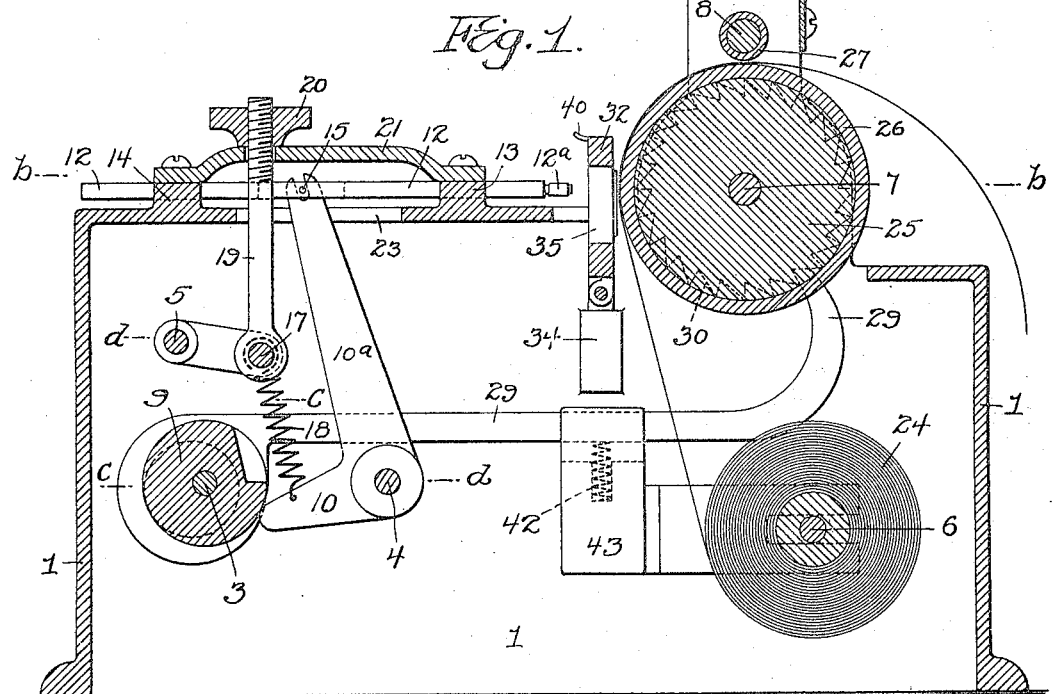
WITNESSES
INVENTOR SAMUEL A. NEIDICH
BY HIS ATTORNEY S. A. NEIDICH.
MACHINE FOR TESTING TYPE WRITER RIBBONS, &c.
APPLICATION FILED MAY 1, 1912.
1,140,912.
Patented May 25, 1915.
2 SHEETS—SHEET 2.
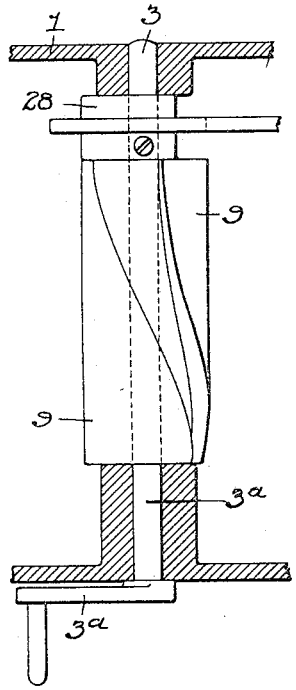
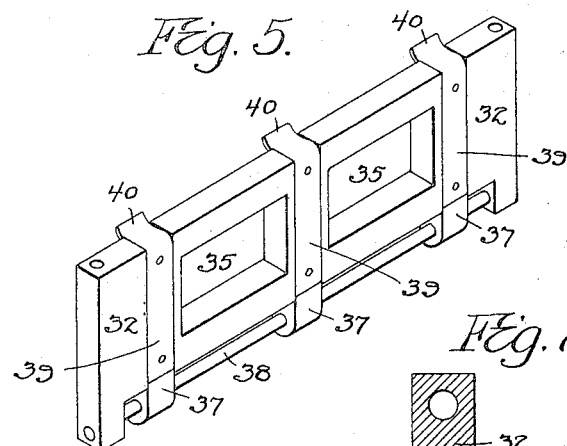
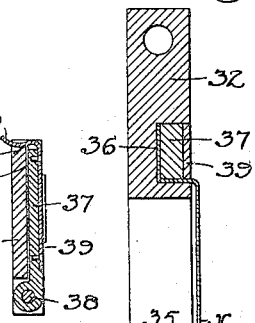
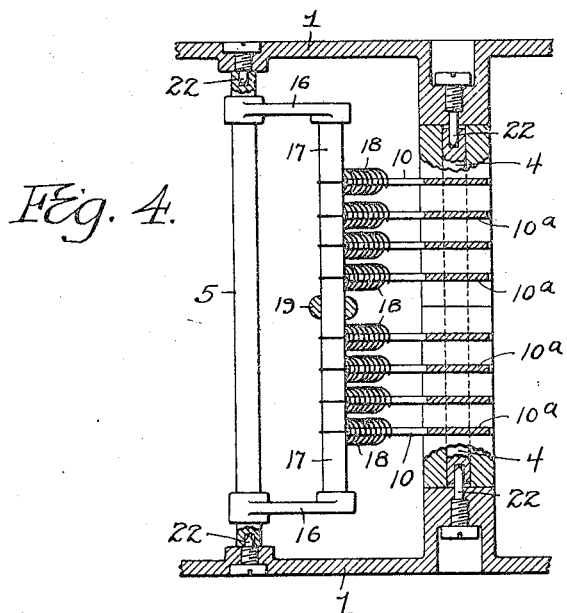
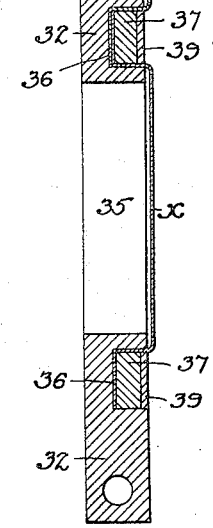
WITNESSES
INVENTOR SAMUEL A. NEIDICH
BY HIS ATTORNEY

UNITED STATES PATENT OFFICE.

SAMUEL A. NEIDICH, OF EDGEWATER PARK, NEW JERSEY.

MACHINE FOR TESTING TYPE-WRITER RIBBONS, &c.

1,140,912.  Specification of Letters Patent.  Patented May 25, 1915.

Application filed May 1, 1912. Serial No. 694,483.

*To all whom it may concern:*

Be it known that I, SAMUEL A. NEIDICH, a citizen of the United States, residing in Edgewater Park, New Jersey, have invented certain Improvements in Machines for Testing Type-Writer Ribbons, &c., of which the following is a specification.

My invention relates to a machine for making comparative tests of typewriter or other inking ribbons, carbon papers, or the like, for the purpose of determining the character or quality of the paper or ribbon fabric, or of the ink with which it is coated or impregnated, or of the durability, intensity or uniformity of such coating or impregnation. Hereinafter, I will, for convenience, refer to the material to be tested as "ribbon."

One object of my invention is to so construct such a machine that the samples of ribbon to be tested may be subjected to test at one and the same time and under like conditions and will produce records closely related as to position, so as to permit of proper comparison.

A further object is to provide for the ready application or removal of the samples of ribbon to the holder therefor or their removal therefrom, and of the holder to or from the machine.

A further object is to replace the ribbon holder and ribbons, after removal from the machine, in exactly the same position with reference to the types, that they previously occupied, so that the types will strike the ribbons on identically the same spots as they did before the holder was removed. This enables the machine to make a comparative test of the recuperation of the inking power of the ribbon, due to the flow of the ink in the cloth by capillary attraction.

A still further object is to permit ready access to the various operative parts of the machine for the purpose of replacement, inspection or repair, and the removal and reapplication of certain related parts of the machine as a unit, and without risk of displacing any of them from their proper relation to the others.

In the accompanying drawings Figure 1 is a longitudinal vertical section of the machine, the section being taken on the line *a—a*, Fig. 2; Fig. 2 is a horizontal section taken on the line *b—b*, Fig. 1; Fig. 3 is a horizontal section taken on the line *c—c*, Fig. 1; Fig. 4 is a view, partly in elevation and partly in horizontal section, taken on the line *d—d*, Fig. 1; Fig. 5 is a perspective view of the ribbon holder detached from the machine; Fig. 6 is a vertical sectional view of said ribbon holder, the section being taken on the line *e—e*, Fig. 2, and Fig. 7 is a horizontal section of said ribbon holder on a larger scale than the other figures.

In the drawings, 1 represents a box-like frame or casing, open at the bottom and adapted to be mounted or secured upon a table, bench or other available support, this box also having, in its top, openings for the reception of various working parts of the machine as hereinafter described. In the opposite sides of the box, and in standards 2 secured to or forming part of said sides and projecting above the top of the box, are formed, or disposed, bearings for a series of shafts 3, 4, 5, 6, 7 and 8, the purpose and function of which will be hereinafter described.

The shaft 3 is the driving shaft of the machine and has at one end a suitable operating handle $3^a$ or other means for imparting rotative movement thereto, and this shaft carries a drum 9 in whose peripheral face is formed a spiral slot having an abrupt forward face and an inclined rear or cam face, this shaft also having secured to it, at one end, an eccentric disk 28.

The shaft 4 constitutes a pivotal mounting for a series of levers, each of which has one arm 10 for being acted upon by the drum 9 and another arm $10^a$ whose upper end enters a slot 11 in a type bar 12 which is guided longitudinally in slots formed in front and rear ribs 13 and 14 on the top of the box 1, so that it can be reciprocated longitudinally therein. The upper end of each lever arm $10^a$ is forked for engagement with a pin 15 crossing the slot 11 in the corresponding type bar 12, so that, as the levers are vibrated back and forth, reciprocating movement will be imparted to the type bars.

The connection between the type bars and the operating levers constitutes no particular part of my invention and other operative connections between these parts may be substituted for those shown and described without departing from my invention.

The shaft 5 has mounted upon it, near each end, an arm 16, and the outer ends of these arms carry a transverse bar 17 to which are connected the upper ends of a series of coiled springs 18, the lower end of each of these springs being connected to a corresponding lever arm 10 and having a tendency to maintain said arm constantly in contact with the drum 9. The tension of the springs 18 is dependent upon the vertical relation of the bar 17 to the shaft 4, and this relation may be changed, as desired, by raising or lowering the bar 17 through the medium of a rod 19, which has, at its lower end, an eye for engaging the rod 17 and is threaded at its upper end for the reception of a nut 20 which bears upon the top of a cap 21 resting upon and secured to the guide ribs 13 and 14 on the top of the box 1.

The opposite ends of the shafts 4 and 5 are mounted, so as to be free to turn, in plugs 22 which have threaded stems screwed into internally threaded openings in the opposite sides of the box 1 and also have slotted heads whereby they can be readily turned and thus withdrawn, when desired, so as to free the shafts 4 and 5 and thus permit both of said shafts, and the parts carried thereby, to be removed as a unit and without disarrangement of any of said parts. Such removal may be effected through a suitable opening 23 in the top of the box, after first removing the cap 21, or from the open bottom of the box after first removing the nut 20 from the rod 19. When thus removed, the parts are open to critical inspection and any part which has become defective from any cause can be readily replaced.

The spirally slotted drum 9 is designed for so acting upon the actuating levers as to retract and then release the type bars in succession, and, upon such release, the levers are so actuated by the springs 18 as to thrust the type bars forwardly, the forward thrust of the various bars being with uniform force, since each of the springs 18 acts with the same force upon its respective lever arm 10 when the latter is released by the drum 9.

The shaft 6 carries a roll of paper 24, the paper sheet passing upwardly and around an impression cylinder 25, mounted on the shaft 7 and having a suitable impression surface 26. The paper sheet passes between the impression cylinder and a contact roll 27 carried by the shaft 8, and the impression cylinder has a step-by-step forward movement imparted to it by means of the eccentric 28 on the shaft 3, the eccentric strap being secured to or forming part of a pawl 29, which engages with the teeth of a ratchet wheel 30 secured to one end of the impression cylinder 25, as shown in Fig. 2. The ratchet wheel 30 has a hub mounted upon the shaft 7 and the other end of the impression cylinder has secured to it a plate 31 with a similar hub which is secured to the shaft 7 by means of a set screw 32 or other suitable means, the hubs fitting snugly between bosses on the opposite standards 2 and thereby preventing lateral displacement of the impression cylinder or of the shaft 7 which carries the same. By slackening the set screw 32, however, the shaft 7 can be laterally withdrawn from its bearings and from the cylinder 25, thus freeing the latter and permitting of its removal for replacement, inspection or repair, the shaft 7 being preferably provided at one end with a head or knob 7ª for facilitating its withdrawal.

The machine is designed, for testing side by side, under equal conditions, two or more samples of ribbon, the tests being directed either to the ink with which the sample is impregnated or coated, or to the durability of the ribbon fabric itself, or to the durability, intensity or uniformity of the coating or impregnation. In order to insure the perfect fairness of such tests it is desirable that the ribbons to be tested shall be held firmly and under appropriate and like tension, between the impression cylinder and the type bars, each of the latter being furnished at its forward end with a type block 12ª or the like, depending upon the character of the impression which is to be made.

I therefore provide a ribbon-carrying bar 32 which has, near its ends, openings for the reception of guide pins 33 extending upwardly from inwardly projecting bosses 34 on the opposite sides of the box 1, so that said ribbon-carrying bar can be readily applied to or removed from its operative position in the machine and, when in position, will always occupy a fixed relation to the other members of the machine. The bar 32 has formed therein as many openings 35 as there may be samples of ribbon to be tested, each opening being adapted for the play of one or more type bars.

The machine shown in the drawings is intended for the testing of but two samples and the type bars are arranged in groups of four each, but it will be evident that the ribbon-carrying bar may be constructed for the reception of more than two samples, that there may be a corresponding number of groups of type bars, that the groups may consist of less than four bars, and that, if desired, but a single type bar may be used in connection with each sample, the idea of using the type bars in groups being to test throughout substantially the entire width of each sample, the quality of the fabric and of the ink with which it is coated or impregnated in order to determine the uniformity of the fabric and the uniform distribution of the ink throughout the sample.

At each end of each of the openings 35 in the ribbon-carrying bar 32 is a recess 36 for the reception of a ribbon clamping bar 37 which is pivoted at its lower end to a rod 38 extending from end to end of the bar 32, each of these clamping plates having secured to the back of the same a spring plate 39 which is bent at its upper end so as to form a spring clip 40, adapted to engage a beveled face 41 on the bar 32 and serving to hold the clamp bar 37 in its ribbon-retaining position but permitting of the ready release of said clamp bar when it is desired to remove the samples of ribbon after completing the test.

Each of the samples to be tested is long enough to cross its respective opening 35 in the bar 32 and overlap the recess 36 at each side of said opening. The clamping bars 37 being thrown back, the samples are laid upon the face of the bar 32, each sample overlying its respective opening 35 and adjoining recesses 36, and the adjoining ends of the samples overlying one another. The clamping bars 37 are then closed and retained by their clips 40 so as to firmly retain the samples on the bar 32, each under a proper degree of tension.

By overlapping the samples at the center of the carrier and providing a single clamp and recess at that point for the retention of both samples the lateral dimensions of the machine and its operative parts are materially reduced as compared with a machine having independent clamps for each end of each sample.

As the shaft 3 is turned the successive type bars deliver their blows successively upon the samples on the carrier 32, and thus form a row of impressions upon the paper lying between said samples and the impression surface of the cylinder 25 and while the type bars are quiescent, in the intervals between their operative movements, the impression cylinder is advanced one step by the pawl and ratchet mechanism so as to present a fresh surface of paper for receiving the next row of impressions.

The impressions produced from one sample are displayed side by side and in close proximity to those produced from the other sample and consequently comparisons of said impressions can be made under the best possible conditions.

The pawl 29 is maintained in constant engagement with the teeth of the ratchet wheel 30 by means of a spring 42 bearing upon the under side of said pawl and contained in a recess in an inwardly projecting stud 43 on one of the side walls of the box 1, as shown in Fig. 1.

When the holder is removed from the machine, in order to allow the ribbon to recuperate, other holders may be used in the machine for testing other ribbons. In this way a great number of ribbons may be tested until exhausted of their ink in the spot struck by the type, whereupon they can be removed, in their holders, from the machine to allow for the testing of other ribbons in other holders, and after resting or seasoning for a predetermined time, the ribbons may again be retested, the types striking on identically the same spots on the various ribbons on the second and subsequent testings that they did when the ribbons were first tested.

When the machine is to be used for testing the comparative durability and intensity of the inking of ribbons, the impression surface of the cylinder 25 may be conveniently covered with a rubber compound similar to that used in the platens of typewriters. When testing the strength of the cloth, or its ability to resist the cutting action of the blows of the type, the surface of the cylinder is preferably of brass or other metal.

I claim:

1. The combination, in a machine for testing inking ribbons or the like, of means for retaining two or more ribbons immovable side by side, means for striking uniform blows from type upon such ribbons, and means for feeding paper between such blows, so that the impressions from such ribbons shall appear side by side and one after another.

2. The combination, in a machine for testing inking ribbons or the like, of type bars, means for operating the same, a removable sample holder, clamps for securing a plurality of inked ribbon samples fixedly in position on said holder, and means for removing and replacing the holder in exact position without disturbing the samples so that successive blows from the same type will strike identical spots on the samples before removal and after replacement of the holder.

3. The combination, in a machine for testing inking ribbons or the like, of a holder for a plurality of samples, means including a plurality of type for striking blows upon such samples, and means for adjusting the strength of the blows of the various types collectively without altering the strength of the blows with reference to each other.

4. The combination, in a machine for testing inking ribbons or the like, of laterally separated type bars, a suitable impression surface, an interposed ribbon carrier having separated openings for the operation of said type bars, and means for confining to said carrier a plurality of samples to be tested, each sample crossing one of the openings of the carrier and being retained in place at such end of said opening.

5. In a machine for testing inking ribbons or the like, a sample-carrier consisting of a unitary structure having separated openings side by side therein over which are placed the samples to be tested, each opening having at each end means for clamping the samples in position thereon.

6. In a machine for testing inking ribbons or the like, a sample-carrier consisting of a unitary structure having separated openings side by side therein over which are placed the samples to be tested, the carrier having, at each end of each opening, a recess and a clamping bar for confining one end of a sample in said recess.

7. In a machine for testing inking ribbons or the like, a sample-carrier having therein a plurality of openings disposed side by side with a separating bar between them, said carrier having means for confining the outer end of each sample thereto and the separating bar having means for clamping thereto the overlapping ends of adjoining samples.

8. In a machine for testing inking ribbons and the like, a sample-carrier having therein a plurality of openings side by side and a plurality of sample-clamping bars one at each end of each opening, said bars being pivoted to the carrier so as to swing into and out of clamping position, and each bar being provided with a spring clip for retaining it in clamping position.

9. In a machine for testing inking ribbons or the like, the combination of the type-bar-operating levers, a shaft carrying said levers, and movable plugs on which said shaft is mounted, whereby, on withdrawing the said plugs, the shaft and its levers can be withdrawn as a unit from the machine.

10. In a machine for testing inking ribbons or the like, the combination of the type-bar-operating levers, spring mechanism acting thereon, a shaft carrying said spring mechanism and movable plugs on which said shaft is mounted, whereby on withdrawing said plugs the spring mechanism and its shaft can be removed as a unit from the machine.

11. In a machine for testing inking ribbons or the like, the combination of a shaft carrying type-bar-operating levers, a shaft carrying spring mechanism which acts upon said levers, and movable plugs supporting said shafts, whereby when said plugs are removed from engagement with the shafts, the latter, and the lever and spring mechanism carried thereby, can be removed from the machine as a unit.

In testimony whereof, I have signed my name to this specification in the presence of two subscribing witnesses.

SAMUEL A. NEIDICH.

Witnesses:
 ELSIE FULLERTON,
 JOS. H. KLEIN.